United States Patent
Friedel et al.

[11] Patent Number: 5,951,734
[45] Date of Patent: Sep. 14, 1999

[54] SEMI-CONVECTIVE FORCED AIR SYSTEM FOR TEMPERING LOW E COATED GLASS

[75] Inventors: Kenneth Friedel, Cherry Hill; Cliff Matukonis, Merchantville, both of N.J.

[73] Assignee: TGL Tempering Systems, Inc., Cinnaminson, N.J.

[21] Appl. No.: 08/911,954

[22] Filed: Aug. 15, 1997

[51] Int. Cl.⁶ .................................................. C03B 25/00
[52] U.S. Cl. ................................ 65/118; 65/160; 65/161; 65/162; 65/269; 65/273; 65/119; 65/349; 65/355; 65/356; 65/DIG. 4; 65/DIG. 13; 364/473.01; 219/385; 219/400; 219/647; 432/144
[58] Field of Search ............................ 65/160, 161, 162, 65/269, 273, 118, 119, 349, 355, 356, DIG. 4, DIG. 13; 364/473.01; 219/385, 400, 647; 432/144

[56] References Cited

U.S. PATENT DOCUMENTS

| | | | |
|---|---|---|---|
| 4,505,671 | 3/1985 | McMaster | 432/144 |
| 4,529,380 | 7/1985 | McMaster | 432/144 |
| 5,039,841 | 8/1991 | Kato et al. | 219/388 |
| 5,118,942 | 6/1992 | Hamade | 250/324 |
| 5,125,948 | 6/1992 | Vanaschen et al. | 65/348 |

Primary Examiner—Peter Chin
Assistant Examiner—Michael P. Colaianni
Attorney, Agent, or Firm—John F. A. Earley; John F.A. Earley III; Harding, Earley, Follmer & Frailey

[57] ABSTRACT

A semi-convective forced air system for heating glass sheets during a heating cycle. The system has a heating chamber, and a longitudinal conveyor extending lengthwise through the heating chamber. A plurality of longitidinally-extending air manifolds are located within the chamber and are in fluid connection with a compressed air source. The manifolds are arranged in at least one widthwise-extending column. Each of the manifolds are oriented parallel to the length of the conveyor and are constructed and arranged to create a downward flow of heated air toward the conveyor to convectively heat the entire length of selected widthwise portions of a sheet of glass on the conveyor. A controller supplies or restricts the flow of compressed air to selected manifolds within a column at predetermined times during the heating cycle.

14 Claims, 5 Drawing Sheets

SEMI-CONVECTIVE FORCED AIR SYSTEM FOR TEMPERING LOW E COATED GLASS

FIELD OF THE INVENTION

The present invention relates to a semi-convective forced air system and method for heating glass sheets for subsequent processing. More particularly, the system and method of the present invention are used for heating low emissivity coated glass before tempering.

BACKGROUND OF THE INVENTION

Forced air furnaces for heating glass sheets in preparation for subsequent processing, such as tempering, are known in the art. For example, McMaster, U.S. Pat. Nos. 4,529,380 and 4,505,671, discloses a glass sheet processing system which includes a heating furnace and a processing station for processing heated glass sheets to provide bending, tempering, bending and tempering, filming, etc. The furnace of U.S. Pat. No. 4,592,380 and 4,505,671 comprises an array of gas jets spaced above a conveyor within a heating chamber. The gas jets supply a primary gas flow directed toward the conveyor to provide forced convection heating of the glass sheets as the sheets are conveyed through the heating chamber.

The gas jets of McMaster are arranged in linear series perpendicular to the length of the conveyor and the direction of travel of the glass sheets. Each series of jets is connected to a common linear supply manifold or conduit. Each supply conduit also extends widthwise in the heating furnace, perpendicular to the length of the conveyor. McMaster teaches that the array of gas jet pumps are spaced from each other transversely to the direction of conveyance so as to uniformly heat each conveyed glass sheet over its entire width.

Heating systems such as described by McMaster appear to provide acceptable results for heating clear glass prior to tempering. Other known systems provide acceptable results for heating coated glass having an emissivity rating greater than about 0.2 prior to tempering. However, manufacturers have now begun to produce coated glass products having emissivity ratings in the range of 0.15–0.04. Prior art heating systems, including the system disclosed in U.S. Pat. Nos. 4,592,380 and 4,505,671, do not provide acceptable results for tempering glass having such low emissivity ratings. Therefore, it would be desirable to provide a system and method of tempering low "e" glass sheeting having an emissivity rating below 0.2.

When glass sheets are conveyed into a heating furnace, the bottom surface heats at a faster rate than the top surface due to contact with the rolls of the conveyor. This causes the bottom surface to expand at a faster rate than the top surface which results in the glass bowing upward into the shape of a bowl. All of the glass sheet's weight is supported in the center of the glass which causes the center of the glass to be overheated. This results in excessive distortion in the center of the glass which can be described as an elongated bubble. Non-uniform glass temperatures also cause the glass to oil can (or become bi-stable). Oil canning (or by-stability) and bubbling are undesirable conditions produced in the glass when the glass sheeting is not heated uniformly. Therefore, it would also be desirable to provide a method and apparatus for heating low "e" coated glass sheets which minimizes oil-canning and bubbling.

When low "e" glass is tempered in prior art systems, it is typically run lengthwise through the furnace due to the size of the furnace. It is also run lengthwise to mitigate the appearance of inherent distortions because the glass sheets are typically installed lengthwise down a room or hallway. However, low emissivity glass is more sensitive to heating in the longitudinal direction than it is in the widthwise direction. When glass is tempered in prior art systems, heat is only applied uniformly over the width of the glass sheet. This does not allow for separate control from edge to edge across the width of the glass. Without this control, the glass will not be heated as uniformly and the undesirable conditions of center bubble and oil canning will ensue. Therefore, it is also desirable to provide a system and method of tempering which uniformly applies heat over the entire length of the sheet in a longitudinal direction to improve aesthetic quality.

SUMMARY OF THE INVENTION

The present invention relates to a semi-convective forced air system for heating glass sheets, during a heating cycle for subsequent processing such as tempering. The system and method are particularly useful for tempering low emissivity coated glass sheeting having an emissivity rating below 0.2. In accordance with the system and method of the present invention, heat is uniformly applied over the entire length of selected widthwise portions of the glass sheet to reduce or eliminate oil canning and bubbling.

The system of the present invention comprises a heating chamber, a longitudinal conveyor extending through the heating chamber, a compressed air source, a plurality of longitudinally-extending air manifolds in fluid connection with the air source, and a controller for restricting the flow of air to selected manifolds at predetermined times during the heating cycle. Each of the air manifolds is oriented parallel to the length of the longitudinal conveyor and constructed and arranged to create a downward flow of heated air toward the conveyor to convectively heat a sheet of glass on the conveyor.

The air manifolds preferably comprise elongate tubes having a longitudinal series of radially extending apertures. The apertures are oriented downwardly toward the conveyor at an angle of about plus or minus 30 degrees from vertical. The air exiting the apertures forms an angle of incidence with the conveyor of about plus or minus 60 degrees. Each of the apertures are oriented oppositely than an adjacent aperture.

The manifolds are preferably located about 4–6 inches above the conveyor. The manifolds are constructed and arranged in longitudinally-extending rows. One of the rows is preferably located above the widthwise center of the conveyor, and one of the rows is preferably located above each of the two widthwise quarter points of the conveyor. The rows, preferably the outer rows, optionally may be adjustable to different widthwise locations above the conveyor.

The conveyor preferably has horizontally-extending rolls constructed and arranged for conveying glass sheets horizontally through the heating chamber.

The air manifolds preferably comprise ½ inch pipe having about 0.04 inch diameter apertures longitudinal spaced about 8½ inches apart. The air manifolds are constructed and arranged to simultaneously convectively heat the entire length of a selected widthwise portion of a glass sheet. A distribution manifold is arranged in fluid connection with the air source and each of the air manifolds.

A solenoid valve and flow meter are arranged in fluid connection between each air manifold and the distribution manifold. An air regulator and filter/dryer are arranged in fluid connection between the air source and the distribution manifold. A programmable computer is used to open and close the solenoids at predetermined times during the heating cycle.

The present invention also provides a method of heating glass sheet for subsequent processing such as tempering. The method comprises the initial steps of loading the glass sheet onto a longitudinally extending conveyor, and orienting the glass sheet such that the lengthwise edge of the sheet is parallel to the length of the conveyor, and conveying the glass sheet into a heating chamber. The glass sheets are then connectively heated in a specified sequence along the entire length of selected widthwise portions of the glass sheet by creating a downward flow of heated air proximate the selected widthwise portion of the glass sheet.

In a preferred embodiment, the lengthwise extending edge portions of the sheet are heated before the lengthwise central portion of the sheet. Preferably, the glass sheet is heated proximate its quarter points before the lengthwise central portion.

In a preferred embodiment, the heating step comprises constantly convectively heating only the quarter points of the sheet for the first 30–40% of the heating cycle; intermittently convectively heating only the quarter points of the sheet for the next 10–20% of the heating cycle; intermittently convectively heating only the lengthwise central portion of the sheet for the next 10–20% of the heating cycle; and, constantly convectively heating only the lengthwise central portion of the sheet for the final 20–50% of the heating cycle.

The method may include the step of transferring the glass sheet from the heating chamber to a second heating chamber of a two zone furnace.

DETAILED DESCRIPTION OF THE PREFERRED EMBODIMENT

Figure 1:
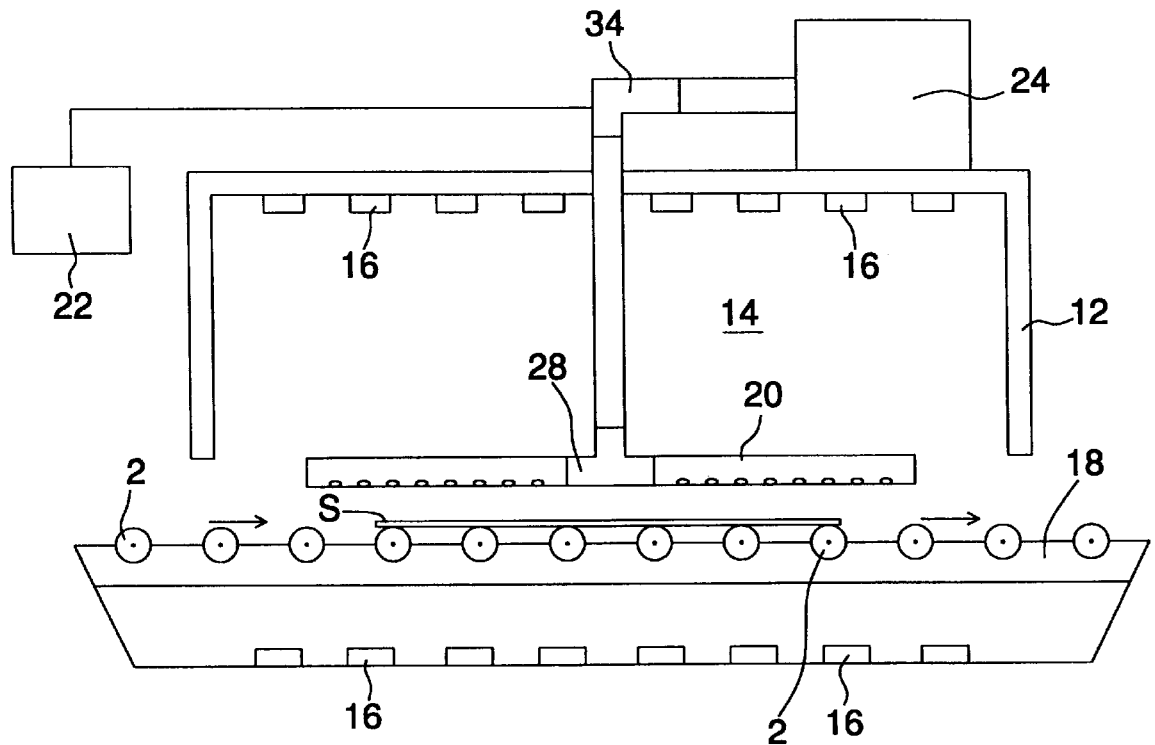
FIG. 1 is schematic illustration of the semiconvective forced air system in accordance with an embodiment of the invention.

The present invention is described with reference to FIGS. 1–7 wherein like reference numerals are used to designate the same components throughout.

The semi-convective forced air system of the present invention is schematically illustrated in FIG. 1 and designated generally by reference numeral 10. The system 10 comprises a furnace with an internal heating chamber 14 in which glass sheets S are heated during a heating cycle in preparation for subsequent processing such as tempering, bending, filming, etc. The furnace housing 12 has a construction known in the art as taught by, for example, U.S. Pat. No. 4,390,359 owned by Tamglass Engineering, Cinnaminson, N.J., incorporated herein by reference. The furnace housing 12 is preferably made of a heat resistant ceramic material. The furnace includes electric resistance heating elements 16 on the top and bottom which provide radiant heat to a work piece located therein.

A longitudinal conveyor 18 extends lengthwise through the heating chamber 14. The conveyor 18 preferably includes a series of rotatably fixed horizontally extending rolls 19 which are driven in unison to convey a work piece, such as glass sheeting S, through the chamber. A conveyor 18 of this type is well known in the art as taught, for example, by U.S. Pat. No. 4,390,359, owned by Tamglass Engineering, Cinnaminson, N.J., incorporated herein by reference. The system 10 has a plurality of longitudinally-extending air manifolds 20 which are arranged in fluid connection with a compressed air source 22 preferably located external to the heating chamber 14. The air manifolds 20 are arranged parallel to the length of the longitudinal conveyor 18 and create a downward flow of heated air toward the conveyor 18 to convectively heat a sheet S of glass supported on the conveyor 18. The convection heat provided by the air manifolds 20 supplements the radiant heat provided by the electric resistance elements 16.

The compressed air source preferably includes a compressor 23 which is capable of supplying about 17 CFM at about 50 psi, which is the equivalent of about a 10 H.P. compressor for the largest system. The air source also preferably includes a 120 gallon stationary air tank 25. The stationary tank has an automatic bottom drain 27 which relieves oil and water build-up from the tank 25.

The system 10 includes a controller 24 which controls the flow of air through each of the plurality of air manifolds 20. The controller 24 selectively restricts or allows a flow of air to each of the air manifolds 20, or rows of manifolds, at predetermined times during the heating cycle to control the heating process and minimize oil canning and bubbling in the glass sheets.

Figure 2:
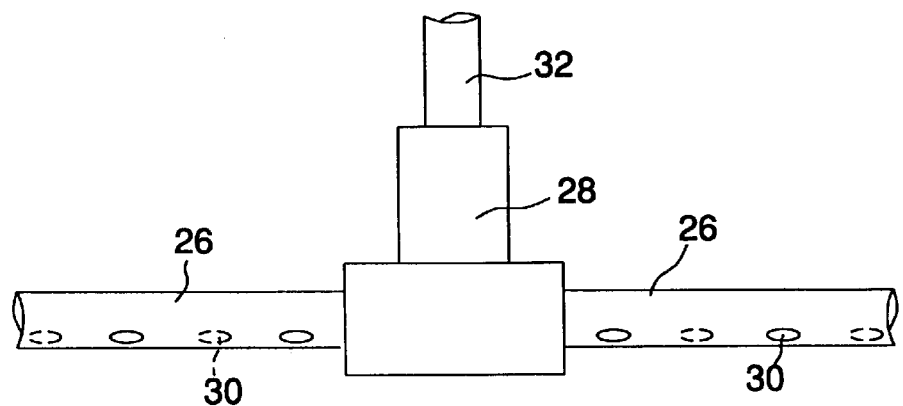
FIG. 2 is a fragmentary, enlarged side elevational view of an air manifold of the system of FIG. 2.
Figure 3:
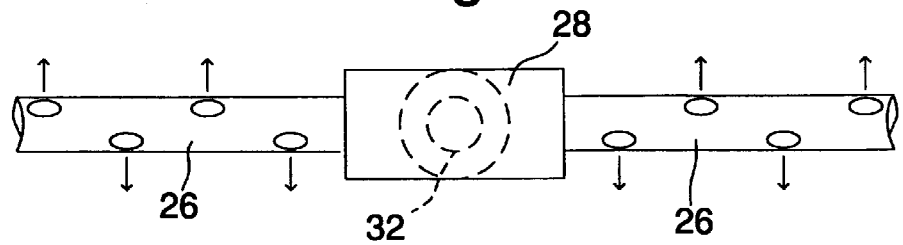
FIG. 3 is a bottom plan view of the air manifold of FIG. 2.
Figure 4:
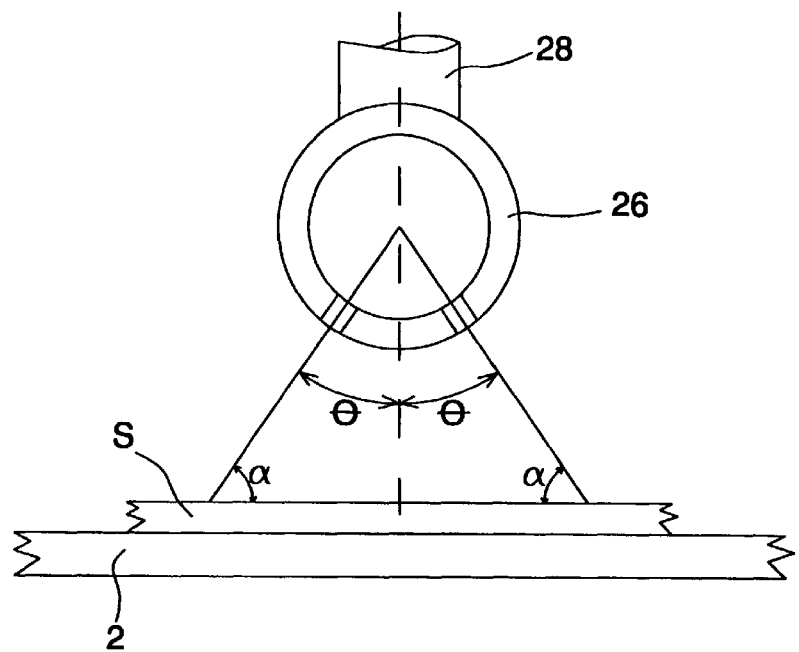
FIG. 4 is an enlarged, cross-sectional view of an air manifold of FIG. 1 shown relative to a glass sheet on a conveyor.

The air manifolds are shown in greater detail in FIGS. 2–4. In a preferred embodiment, each manifold comprises a pair of elongate tubes 26 connected at one end by a hollow "T" connector 28. The other ends of the elongate tubes 26 are sealed with a cap, plug or other means.

Each elongate tube 26 has a longitudinal series of radially extending apertures 30. Preferably, the apertures 30 have a diameter of about 0.04 inches and are spaced about 8½" from each other along the entire length of the elongate tubes 26. The elongate tubes preferably comprise ½" schedule 40, type 304 stainless steel hollow pipe.

Referring to FIG. 4, the apertures traverse the walls of the tubes 26 and are oriented downwardly towards the conveyor 18 at an angle theta θ from vertical. Preferably, the angle theta θ is plus or minus 30 degrees from vertical. The angle theta θ is selected to create a compromise wash effect and turbulent effect on the glass sheet. Air is discharged from the apertures (depicted by arrows) and impinges the sheet S at angle of incidence alpha α of about plus or minus 60 degrees.

As best seen in FIG. 3, the apertures 30 are alternatively oriented in opposite directions. For example, the first, third, fifth, . . . aperture on the air manifolds are oriented at an angle theta θ of plus 30 degrees and direct air towards one side of the glass sheet; the second, fourth, sixth, . . . apertures are oriented at an angle theta θ of minus 30 degrees and direct air toward the opposite side of the glass sheet.

Each air manifold 20 includes a supply tube 32 which is connected at one end to the third port of the "T" connector 28 and at the other end to a distribution manifold 34. The distribution manifold 34 is arranged in fluid connection with the compressed air source 22 and distributes compressed air to each of the air manifolds 20.

A solenoid valve 36 and a flow meter 38 are arranged in fluid connection between the distribution manifold 34 and each of the air manifolds 20. Each solenoid valve is connected to a controller 24 which selectively opens and closes each solenoid valve at different times during a heating cycle. Each flow meter 38 controls the volume of air entering the respective air manifolds 20. Preferably, each flow meter 38 comprises a Dwyer Rate Master Flowmeter, model No. RMC-104-BV having ½ NPT connections and is set at a flow rate of 200 standard cubic feet per hour. Preferably, the solenoid valves comprise Asco two way solenoid valves, model No. 8210C94 having ½ NPT connections and ⅝" orifice with a maximum operating pressure differential of 100 psi. The controller is preferably a programmable logic computer which is well known in the art.

A filter/dryer 40, air regulator 42 and solenoid valve 44 are arranged in fluid connection intermediate the compressed air source 22 and the distribution manifold 34. Preferably the filter/dryer 40 comprises a 40 micron filter manufactured by ARO, part number F25242-111 and a coalescing filter manufactured by ARO, part number F25242-311; the air regulator is preferably manufactured by ARO, part number R27241-100 and the pressure gauge is manufactured by ARO, part number 100067; and, the solenoid valve 44 is manufactured by Burkert, part number 453058.

The air manifolds 20 are arranged in banks. The air manifolds are capable of providing forced air convective heating over the full length of a glass sheet S during the entire time which the glass sheet S is being heated. However, as described below, typically convective heating is sequentially provided over the entire length of selected widthwise portions of the glass sheet.

The system may be used in a batch type furnace or in a continuous furnace during the heating period only. In a continuous furnace, the air manifolds 20 would not extend over the full length of the continuous system. In a preferred embodiment, ambient compressed air is supplied to the air manifolds 20; however, heated compressed air may also be supplied to the air manifolds 20 in the system of the present invention.

Figure 5A:
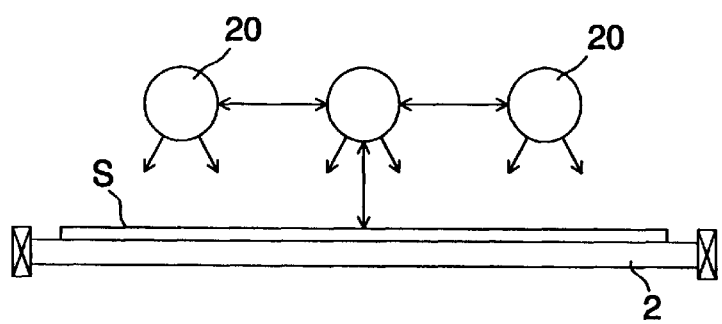
FIGS. 5a and 5b are schematic illustrations of a bank of air manifolds shown relative to a glass sheet on a conveyor in accordance with an embodiment of the invention.
Figure 5B:
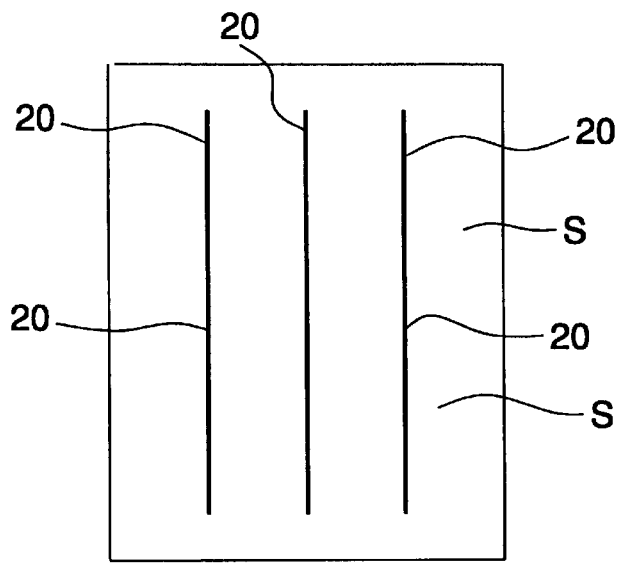

A preferred location of each manifold is illustrated for two different furnaces in FIGS. 5 and 6. FIGS. 5a and 5b shows the location of the air manifolds in a 48"–60" furnace. In this embodiment, the air manifolds have a widthwise spacing W of about 15" and are located at a height H of about 4"–6" above the surface of the glass sheet S. Referring to FIG. 5b, in a preferred embodiment, the bank of air manifolds 20 comprises three longitudinally extending manifolds. The approximate location of each air manifold above the glass sheet S is illustrated in FIG. 5b and shows that the entire glass sheet S or the entire length of a selected widthwise portion of a glass sheet S can be heated by the air manifolds.

Preferably, one manifold is located proximate the widthwise center of the sheets, and one manifold is located proximate each widthwise quarter point i.e., the location ¼ the width of the sheet from each edge. For example, if the sheet is 36" wide, a manifold is preferably located 9 inches from each lengthwise edge of the sheet.

Figure 6A:
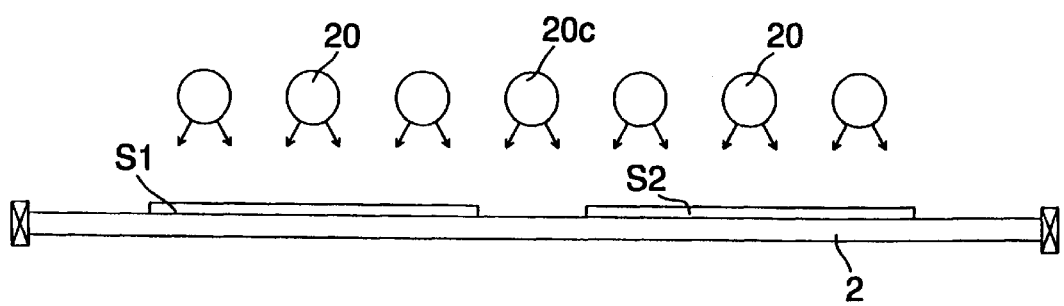
FIGS. 6a and 6b are schematic illustrations of arrangements of air manifolds shown relative to a glass sheet on a conveyor in accordance with another embodiment of the invention.
Figure 6B:
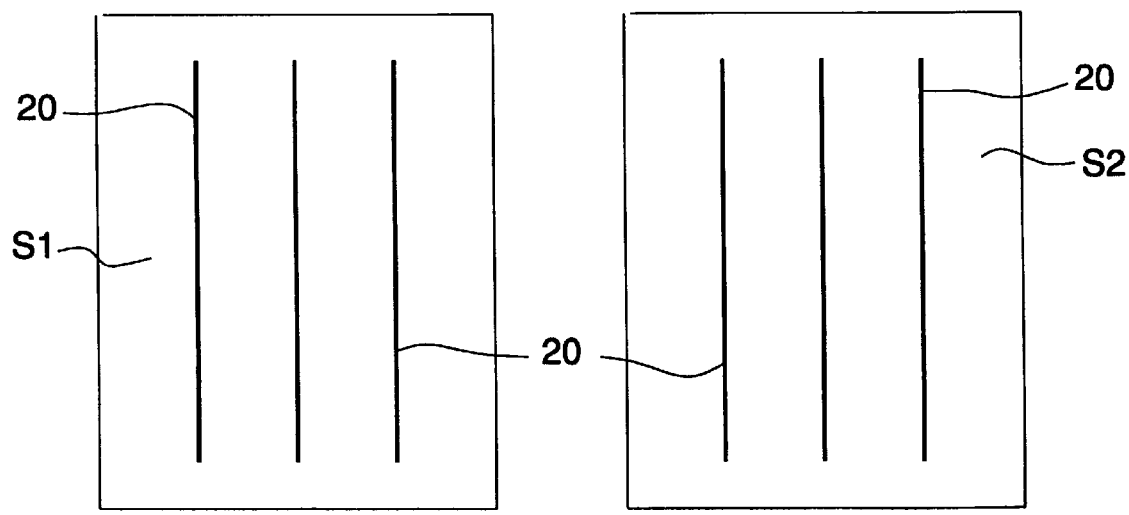
Figure 7:
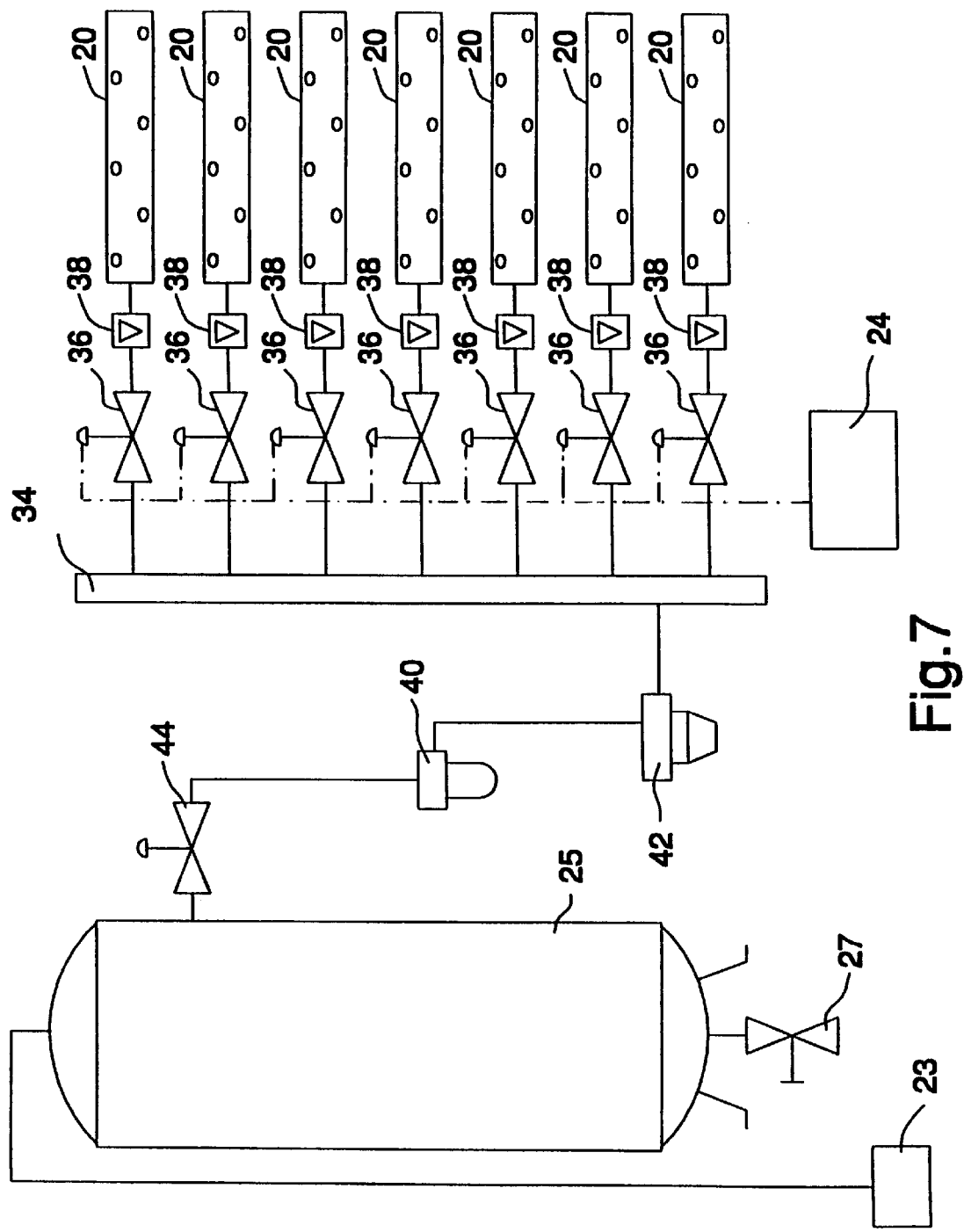
FIG. 7 is a schematic illustration of the control system in accordance with an embodiment of the invention.

The location of the air manifolds 20 for an a 72" or 86" or 96" furnace is shown in FIGS. 6a and 6b. Preferably, this arrangement comprises two separate banks of air manifolds 20 for simultaneously heating a first glass sheet S1 and a second glass sheet S2. The air manifolds 20 have a widthwise spacing W and a heightwise spacing H similar to the spacing of the 60" furnace described above. In this embodiment, each bank comprises three longitudinally extending manifolds. The furnace may also have a seventh air manifold 20c located proximate the center of the furnace for use in heating a single, large glass sheet.

During the heating process, the controller 24 restricts or allows the flow of air to selected manifolds at predetermined times during the heating cycle. In the method of the present invention, the entire length of selected widthwise portions of the glass sheet is convectively heated in a specific sequence by controlling the flow of air to selected air manifolds 20.

For example, as described above, when glass sheets are conveyed into a heating furnace, the bottom surface heats up and expands faster than the top surface due to contact with the rolls of the conveyor. As a result, the glass sheet curls up on the lengthwise outer edges. Therefore, in a preferred embodiment, the manifolds proximate the lengthwise edges of the glass sheet are initially turned on to create top side convective heating of the glass sheet edges to prevent the sheet from curling up. Later in the heating cycle, the manifolds proximate the lengthwise outer edge of the glass sheet are turned off and the manifold proximate the center of the glass sheet is turned on to provide convective heating of the center portion of the sheet. By using this general technique, the glass sheet can be heated more uniformly to mitigate oil canning and bubbling.

The method of the present invention can be used on small (for example, 20"×20") or large (for example, 34"×76") sheets of glass. However, the improved results of the present invention are most noticeable in large pieces of glass since small pieces of glass do not generally tend to exhibit oil canning and bubbling.

The actual amount of time during which convective heating is applied to a glass sheet by each of the manifolds will vary depending on the coating emissivity of the glass sheet. Convective heating is preferably only intermittently applied during the transition phase of the heating cycle where convective heat is moved from one part of the glass to another. Preferably, intermittent heating is done by time proportioning up or down the supply of air to a selected row of manifolds. During time proportioning, air is supplied to the selected manifolds for an ascending or descending amount of time per time interval. For example, during time proportioning up, air is supplied to the manifolds for 6 seconds out of every 10 second interval, then for 7 seconds out of every 10 second interval, . . . then for 10 seconds out of every 10 second interval.

EXAMPLE

A glass sheet measuring 30"×75" may be heated in a single zone furnace having the manifold arrangement shown in FIGS. 5a and 5b using the following sequence steps:

1) Constantly heat the longitudinal edges of the sheet by supplying full air flow to the rows of manifolds above the quarter points for the first 30–40% of the heating cycle. During this time, air flow to the center row of manifolds is restricted;

2) Intermittently heat the edges of the sheet by time proportioning down air flow to rows above the quarter points for the next 10–20% of the heating cycle. Then, restrict all air flow to the rows above the quarter points;

3) Intermittently heat the center portion of the sheet by time proportioning up air flow to the center row manifolds for the next 10–20% of the heating cycle; and, 4) Constantly heat the center of the sheet by supplying full air flow the center row manifolds.

Figure 8A:
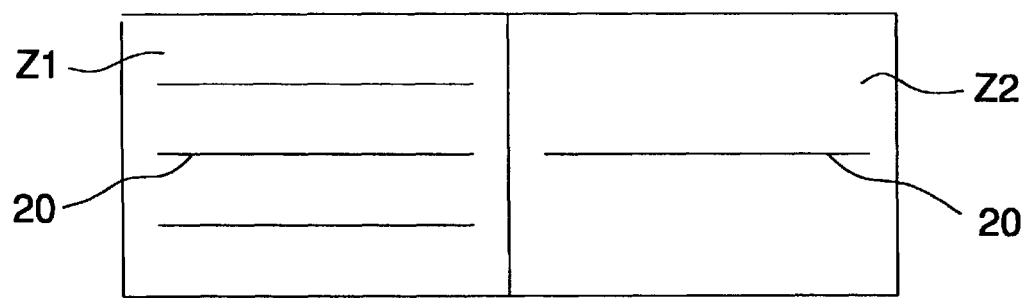
FIGS. 8a–c are schematic illustrations of arrangements of air manifolds shown relative to glass sheets in a two-zone oven in accordance with a further embodiment of the invention.
Figure 8B:
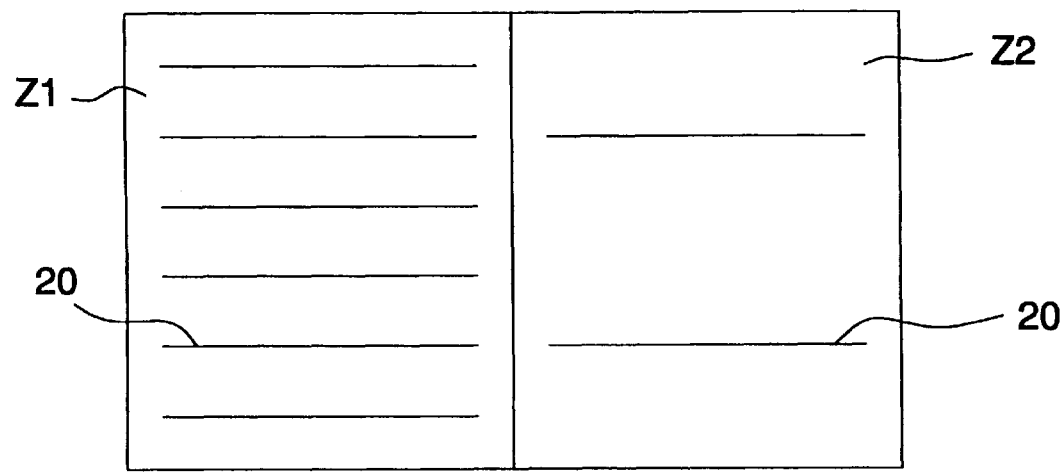
Figure 8C:
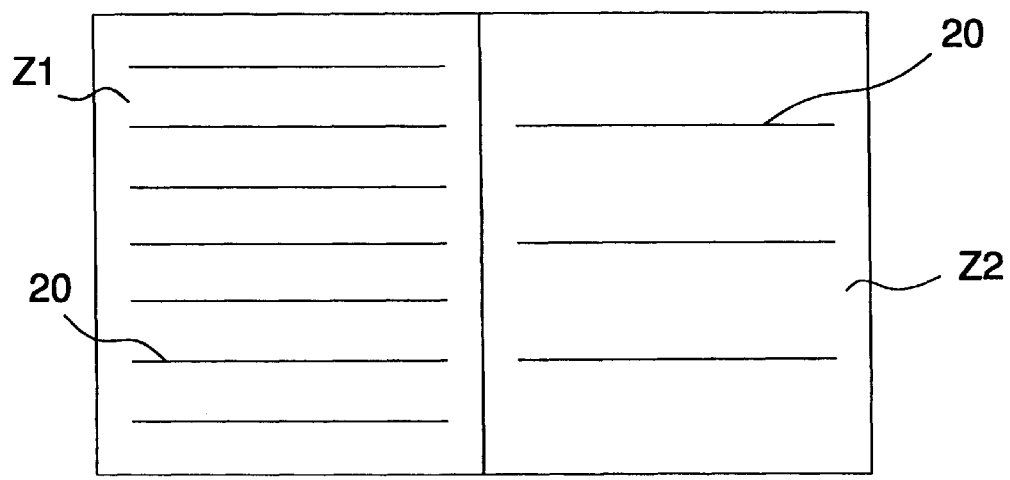

The system and method of the present invention may be used in a single zone or two zone (21, 22) furnace. In a two zone furnace, each zone would preferably have a bank of manifolds, although the arrangement of the banks would not necessarily be the same. For example, the location of the air manifolds in a 48"–60", two-zone (21,22) oven is shown in FIG. 8a. The location of the air manifolds in a 72" or 86" or 96", two-zone oven arranged for simultaneously heating two glass sheets is shown in FIG. 8b. The location of the air manifolds in a 72" or 86" or 96", two-zone oven arranged for heating a single large glass sheet is shown in FIG. 8c.

We claim:

1. A semi-convective forced air system for heating glass sheets during a heating cycle, comprising:
   a) a heating chamber having a length and a width;
   b) a longitudinal conveyor extending lengthwise through said heating chamber;
   c) a compressed air source;
   d) a plurality of longitudinally-extending air manifolds within said chamber, said manifolds arranged in at least one widthwise-extending column, each of said manifolds in fluid connection with said air source, each of said air manifolds oriented parallel to the length of said longitudinal conveyor and constructed and arranged to create a downward flow of heated air toward said conveyor to convectively heat the entire length of selected widthwise portions of a sheet of glass on said conveyor; and,
   e) a controller for supplying or restricting the flow of air to selected manifolds within each column at predetermined times during the heating cycle.

2. The system recited in claim 1, said air manifolds comprising elongate tubes having a series of radially extending apertures, said apertures being spaced along the length of said tube.

3. The system recited in claim 2, said apertures oriented downwardly toward said conveyor at an angle of about either plus or minus 30 degrees from vertical.

4. The system recited in claim 3, each of said apertures being oriented downwardly at an angle different than an adjacent aperture.

5. The system recited in claim 1, said manifolds being located about 4–6 inches above said conveyor.

6. The system recited in claim 1, said manifolds constructed and arranged in longitudinally-extending rows, one of said manifold rows located above the widthwise center of said conveyor, and a manifold row located above each of the two widthwise quarter points of said conveyor.

7. The system recited in claim 1, said manifolds being adjustable to different widthwise locations above said conveyor.

8. The system recited in claim 1, said manifolds comprising ½ inch pipe having about 0.04 inch diameter apertures longitudinal spaced about 8½ inches apart.

9. The system recited in claim 1, said manifolds constructed and arranged to simultaneously convectively heat the entire length of a selected widthwise portion of a glass sheet.

10. The system recited in claim 1, including a distribution manifold in fluid connection with said air source and each of said air manifolds.

11. The system recited in claim 10, including a solenoid valve and flow meter in fluid connection between each air manifold and the distribution manifold.

12. The system recited in claim 11, including an air regulator and filter/dryer in fluid connection between said air source and the distribution manifold.

13. The system recited in claim 12, said controller comprising a computer programmable to open and close said solenoids at predetermined times during the heating cycle.

14. A semi-convective forced air system for heating glass sheets during a heating cycle, comprising:
   a) a heating chamber;
   b) a longitudinal conveyor extending through said heating chamber;
   c) a compressed air source;
   d) a plurality of longitudinally-extending air manifolds within said chamber, said air manifolds arranged in at least one widthwise-extending column, each of said manifolds in fluid connection with said air source, each of said air manifolds oriented parallel to the length of said longitudinal conveyor and constructed and arranged to create a downward flow of heated air toward said conveyor to convectively heat the entire length of selected widthwise portions of a sheet of glass on said conveyor; and,
   e) a controller for supplying or restricting the flow of air to selected manifolds within each column at predetermined times during the heating cycle;

said air manifolds comprising elongate tubes having a series of radially extending apertures, said apertures being spaced along the length of said tube;

said apertures oriented downwardly toward said conveyor at an angle of either about plus or minus 30 degrees from vertical;

said apertures being oriented downwardly at an angle different than an adjacent aperture;

said manifolds being located about 4–6 inches above said conveyor;

said manifolds constructed and arranged in longitudinally-extending rows, one of said rows located above the widthwise center of said conveyor, and a row located above each of the widthwise quarter points of said conveyor;

said manifolds comprising ½ inch pipe having about 0.04 inch diameter apertures longitudinal spaced about 8½ inches apart;

said manifolds constructed and arranged to simultaneously connectively heat the entire length of a selected widthwise portion of a glass sheet;

including a distribution manifold in fluid connection with said air source and each of said air manifolds;

including a solenoid valve and flow meter in fluid connection between each air manifold and the distribution manifold;

including an air regulator and filter/dryer in fluid connection between said air source and the distribution manifold; and said controller comprising a computer programmable to open and close said solenoids at predetermined times during the heating cycle.

* * * * *